United States Patent [19]
Brown

[11] Patent Number: 5,732,788
[45] Date of Patent: Mar. 31, 1998

[54] GOLF VEHICLE

[75] Inventor: Fred C. Brown, St. Albans, England

[73] Assignee: Electric Mobility Corporation, Sewell, N.J.

[21] Appl. No.: 618,997

[22] Filed: Mar. 21, 1996

Related U.S. Application Data

[63] Continuation-in-part of Ser. No. 528,196, Sep. 14, 1995, abandoned.

[51] Int. Cl.$^6$ .................................................. B60K 26/00
[52] U.S. Cl. ........................... 180/326; 280/DIG. 5; 180/907
[58] Field of Search .................... 180/907, 65.1; 297/344.1, 344.22, 344.24, 344.26, 344.18, 344.13; 280/DIG. 5

[56] References Cited

U.S. PATENT DOCUMENTS

| | | | |
|---|---|---|---|
| 3,043,389 | 7/1962 | Steinberg | 280/DIG. 5 |
| 4,951,766 | 8/1990 | Basedow et al. | 180/6.5 |
| 5,036,938 | 8/1991 | Blount et al. | 180/208 |
| 5,150,762 | 9/1992 | Stegeman et al. | 180/208 |
| 5,482,354 | 1/1996 | Gryp | 297/344.22 |
| 5,522,641 | 6/1996 | Infanti | 297/344.13 |

Primary Examiner—Brian L. Johnson
Assistant Examiner—Jonathan E. Butts
Attorney, Agent, or Firm—Edmund M. Jaskiewicz

[57] ABSTRACT

The golf vehicle has steerable front wheels on a front portion of a frame together with a steering mechanism which includes an upstanding rearwardly inclined handle bar. A pair of drive wheels and a power source drivingly connected to the drive wheels are on a rear portion of the frame. A seat unit is mounted on the rear portion of the frame and has adjustment means for moving the seat rearwardly and forwardly along a plurality of longitudinal positions and for pivoting the seat 360° in any of these longitudinal positions. The pivot axis of the seat is so located that when the seat is pivoted 180° from a front operating position, the front edge of the seat will extend rearwardly beyond the rear end of the frame rear portion so as to readily enable an occupant of the vehicle to make golf shots while seated. In a modification, the seat is fixed on a seat frame which is pivotable and lockable in any of the pivoted positions. The pivot axis of the seat frame is at the rear of the seat such that when the seat is pivoted 90°, 180° or 270° the front of the seat frame protrudes well beyond the side and rear outlines of the vehicle.

3 Claims, 12 Drawing Sheets

GOLF VEHICLE

RELATED APPLICATION

The present application is a continuation-in-part of the application filed Sep. 14, 1995 and having the Serial No. 08/528,196, now abandoned.

FIELD OF THE INVENTION

The present invention relates to self-propelled personal vehicles intended for persons who have some physical disability, more particularly, to such a vehicle which will enable persons having partial or total walking disability to participate in numerous activities including playing golf.

DESCRIPTION OF RELATED ART

Such personal vehicles have been adapted for a golf course so as to enable one or two players to travel in a golf vehicle so as to be able to participate in a round of golf without undue physical exertion since these golf carts also carry golf clubs and thus eliminate the need for a caddy. Even persons who do not have the full use of their legs are thus able to participate in golf by being able to travel over the golf course without walking. However, in order to make a golf shot it is generally necessary that the user of the golf vehicle get out of the vehicle and take a proper stance adjacent the golf ball in order to make the next shot. Some persons can accomplish this with the use of canes or crutches but other persons have such walking disabilities that even exiting or entering such a golf cart is virtually impossible for them. Thus, such persons are precluded from playing golf with existing golf vehicles.

Light weight three wheel vehicles have been proposed in which the occupant is seated upon a pivotable seat which may, in some cases, enable a seated occupant to make a golf shot. However, while such vehicles may facilitate such disabled persons from at least playing some form of golf, the vehicle itself is not especially adapted for golf. The seats on such vehicle generally pivot up to about 90° on each side and thus the occupant of the vehicle is limited to the positions of the vehicle with respect to a golf ball.

Also, many such golf vehicles are not generally allowed on golf courses since they are too heavy and thus cannot be used on the approaches to the golf greens. Such golf vehicles are generally absolutely forbidden to go on the golf greens themselves. In addition, these vehicles do not provide ready access to many forms of sand traps and bunkers which are found on many golf courses and thus serve to limit the shots which a user of such vehicles can make.

Vehicles which are intended to enable disabled persons to play golf are disclosed in U.S. Pat. Nos. 5,341,894 and 5,363,934. However, these prior art vehicles do not enable an occupant of the vehicle to play golf while seated in all positions of the vehicle with respect to the golf ball.

It is therefore the principal object of the present invention to provide a novel and improved golf vehicle which will enable the occupant of such a vehicle to make a wide variety of golf shots while being seated in the vehicle.

It is another object of the present invention to provide such a vehicle in which the seat can be pivoted and moved longitudinally on the vehicle between a wide range of positions while the occupant remains seated.

It is a further object of the present invention to provide such a vehicle which will enable a seated occupant to approach a golf ball from any position in order to make the golf shot.

It is an additional object of the present invention to provide such a golf vehicle which is light in weight and thus could be used on various parts of a golf course which are normally forbidden to golf carts.

It is still another object of the present invention to provide such a golf vehicle which will enable a seated occupant to achieve a wide range of positions by merely pivoting the seat so as to be able to make a variety of golf shots.

It is a still further object of the present invention to provide a golf vehicle wherein the seat can be pivoted into positions of 0°, 90°, 180° and 270° and angles therebetween from all of which positions the occupant of the vehicle can still make golf shots while seated.

According to one aspect of the present invention, such a golf vehicle may comprise one or two steerable front wheels on a front portion of a frame together with a steering mechanism including an upstanding rear-wardly inclined handle bar. A pair of drive wheels and a power source drivingly connected to the drive wheels are on a rear portion of the frame. A seat unit is mounted on the rear portion of the frame and has adjustment means for moving the seat rearwardly and forwardly along a plurality of longitudinal positions and for pivoting the seat 360° in said longitudinal positions. The pivot axis of the seat is so located that when the seat is pivoted 180° from a front operating position the front edge of the seat will extend rearwardly beyond the rear end of the frame rear portion or when the seat is pivoted 90° or pivoted by 270° from the front operating position the front edge of the seat will project laterally beyond the sides of the vehicle frame so as to readily enable an occupant of the vehicle to make golf shots while seated.

A cover member is mounted on the inclined handle bar and a rack or other structure for carrying a golf bag is mounted on this cover member. The vehicle is further provided with fold-down foot rests on each side of the rear portion of the frame so as to support at least one foot of a seated occupant when the seat is in a pivoted position.

The seat may also include a seat post frame mounted on the frame rear portion and a base is mounted on this seat post frame. The seat itself is then mounted on the base. The seat is then pivotable on the base which is slidable along the seat post frame. As a modification, the base can be made pivotable upon the seat post frame and the seat itself is movable longitudinally along the base.

In a further modification, the vehicle is provided with a pivotable seat and a pivot axis of this seat is positioned rearwardly of the vehicle so that a golfer occupant of the seat needs merely to pivot the seat to a selected position in order to make a golf shot. Because of its positioning, it is only necessary to pivot the seat and sliding of the seat is eliminated.

Other objects and advantages of the present invention will be apparent upon reference to the accompanying description when taken in conjunction with the following drawings, which are exemplary, wherein.

IN THE SPECIFICATION

Proceeding next to the drawings wherein like reference symbols indicate the same parts throughout the various views, a specific embodiment and modifications of the present invention will be described in detail.

Figure 1:
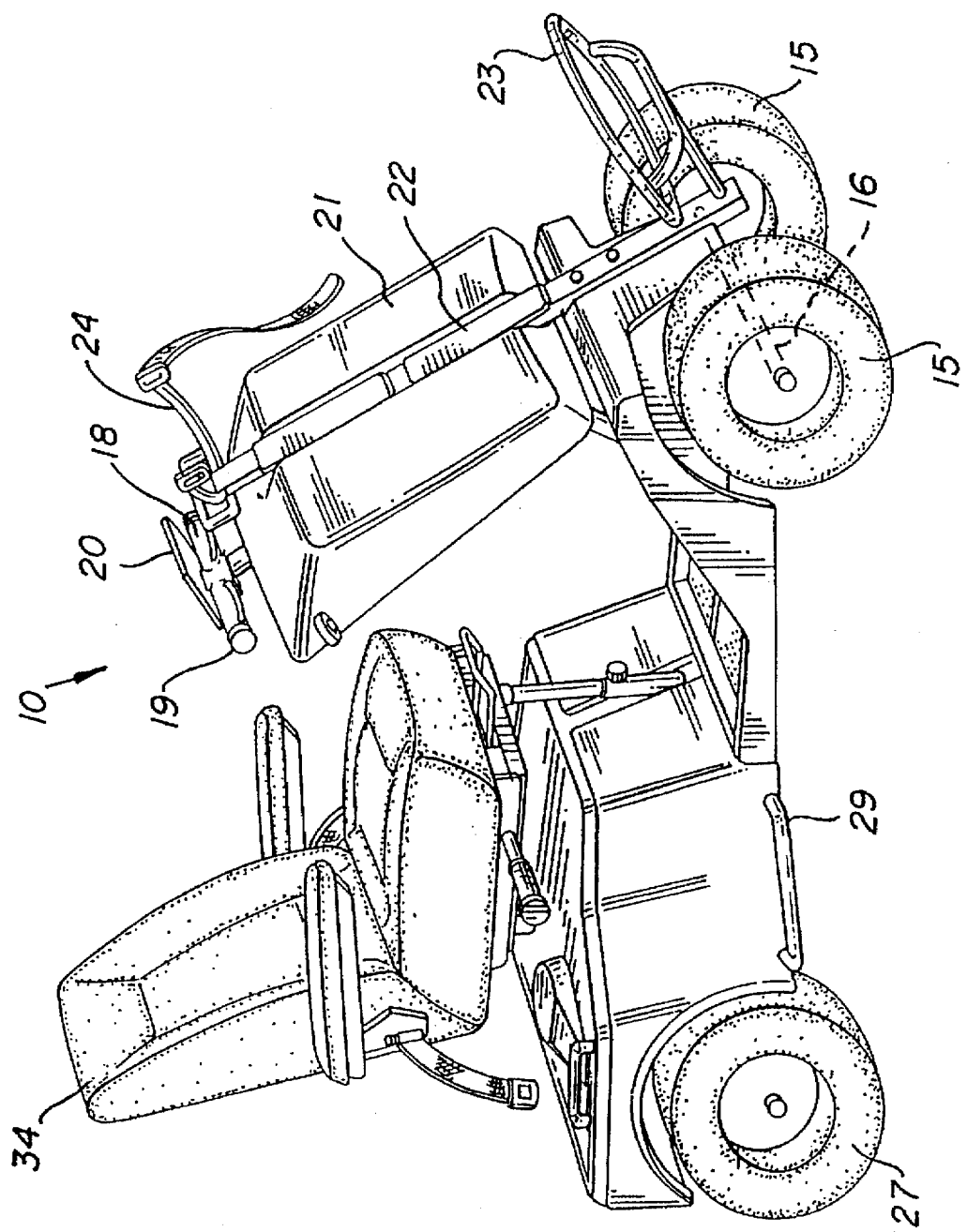
FIG. 1 is a perspective view of the golf vehicle according to the present invention viewed from the front, side and top thereof.

As may be seen in FIG. 1, a personal mobility golf vehicle is indicated generally at 10. The vehicle comprises a light weight frame indicated generally at 11 which may be comprised of aluminum or steel tubing. This frame 11 comprises a front portion 12 and a rear portion 13 as divided by a center line indicated at 14. The frame front portion 12 comprises a pair of steerable front wheels 15 mounted on a suspension 16 to which is attached a steering mechanism which includes an upstanding rearwardly inclined handlebar 17. At the upper end of the handle bar 17 is a transverse bar 18 which is straight but may be curved or bent rearwardly as may be better seen in FIG. 5 and the ends of this bar are provided with hand grips 19 to facilitate steering of the vehicle. A score card holder 20 is provided on the handle bar 18.

Figure 5:
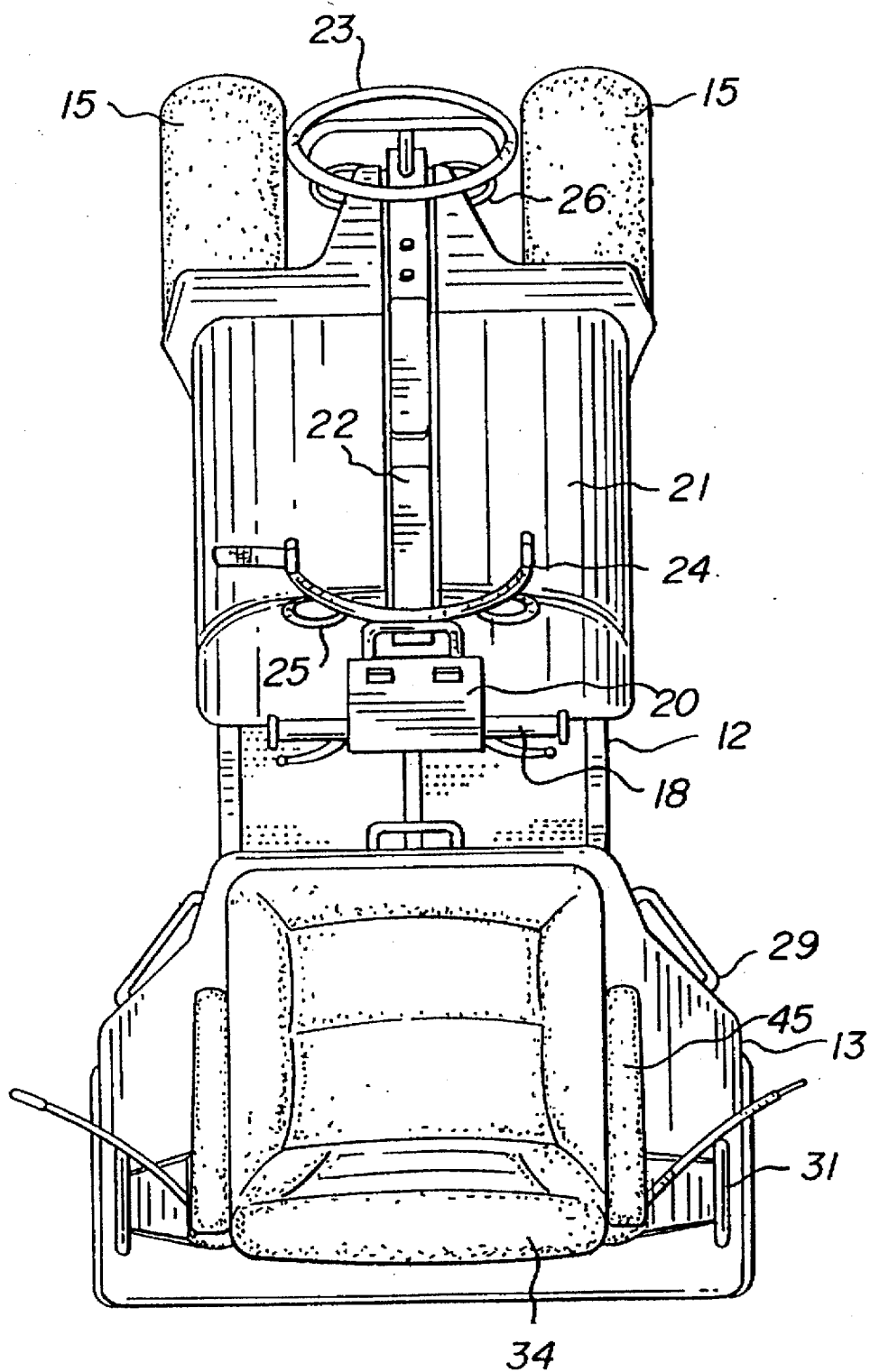
FIG. 5 is a top plan view of the vehicle in FIG. 1.
Figure 6:
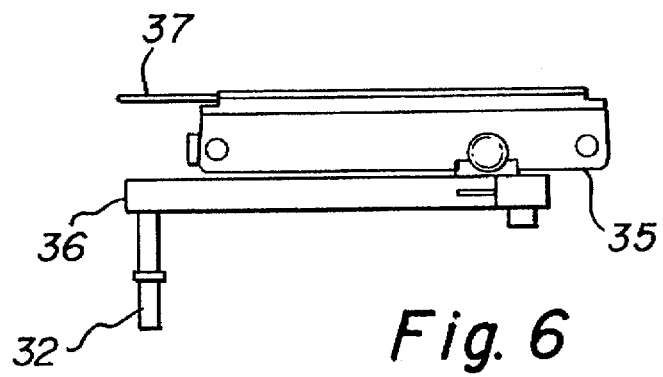
FIG. 6 is a side elevational view in enlarged scale of the seating unit upon which the seat is mounted as shown in FIG. 2.

Mounted on the forward surface of the inclined handle bar 17 is a handle bar cover member 21 which extends substantially the width of the forward portion of the vehicle as also may be seen in FIG. 5. The cover member 21 may be provided with pockets or compartments to hold various small articles, such as golf balls, tees or additional equipment or articles commonly used by golfers.

On the front or leading surface of the handle bar cover 21 there is provided a rack 22 upon which a golf bag is positioned and held in place by straps as is the common practice. By positioning the golf bag on the front of the vehicle, the occupant can easily survey the golf clubs in his bag when contemplating the next shot and can remove the club from the bag without the necessity of getting out of the vehicle and going to the rear thereof as is the common practice. Further, by having the golf clubs constantly in view, the occupant can easily ascertain any missing clubs which may have been mislaid during play. The golf bag rack 22 comprises a base portion 23 upon which the base of the golf bag rests and an upper curved bracket 24 which retains the upper portion of the golf bag. On the upper bracket 24 there are attached a pair of spaced loops 25 which are for the purposes of retaining a crutch or cane. Corresponding loops 26 or cups are positioned in the base 23 of the golf bag to receive the bottom portions or ends of the crutches or canes.

The frame rear portion 13 comprises a pair of drive wheels 27 which are drivingly connected to a single power source or twin power sources located within the rear frame member 13 but not shown. The rear frame member is formed of a tubular frame portion upon which is supported a frame rear cover member 28. A portion of the tubular frame projects outwardly on each side of the frame rear portion shown at 29 to function as a protective member for the rear wheels and rear frame portion which houses a transmission for the power source for the rear drive wheels.

Also attached to the rear frame 13 is a pair of hand holds or grips 31 which the occupant of the vehicle can use to assist in adjusting of the seat.

Also mounted on the frame rear portion 13 is a seat post frame 32 upon which is mounted a seat unit 33 comprising a fully spring seat 34 mounted upon a seat base 35. The seat base 35 is slidably mounted on rail members 36 which are components of the seat post frame 32. The forward portion of the seat base is provided with a U-shaped lever 37 which, in the position shown, locks the seat base in one of a plurality of positions as defined by the openings or notches 38. When the lever 37 is pulled up, it releases the lock and the seat base is free to slide longitudinally a limited distance which is of the order of about 9 inches.

Figure 7:
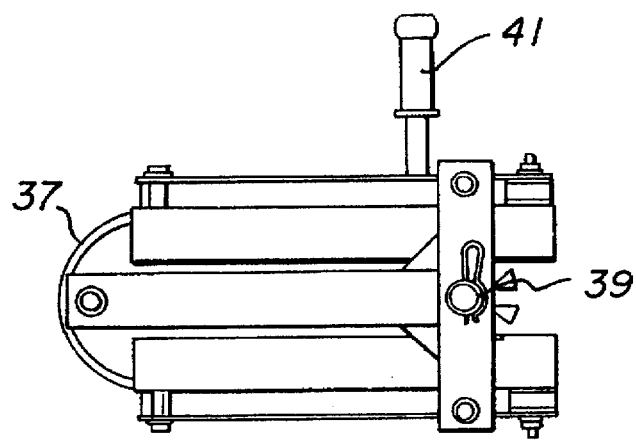
FIG. 7 is a top plan view of the seat unit shown in FIG. 6.
Figure 8:
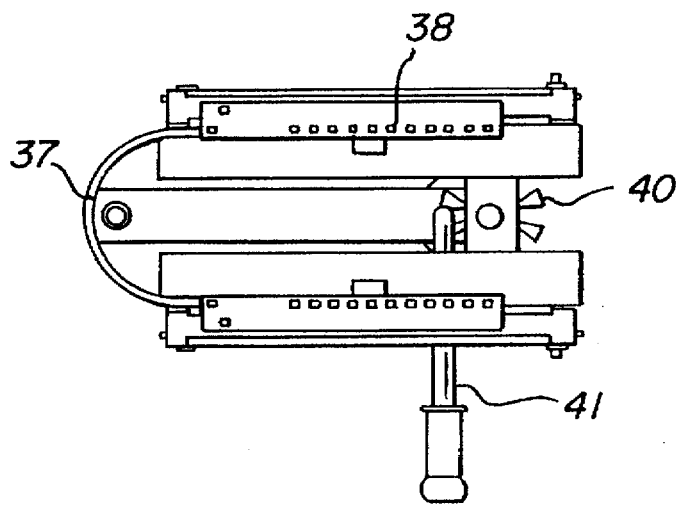
FIG. 8 is a bottom plan view of the seat unit shown in FIG. 6.

A seat 34 is mounted pivotally on a vertical post 39 as may be seen in FIG. 7. On the lower portion of the seat post 39 is a spider 40 which has a plurality of radially extending slots engageable by a detent on a locking lever 41. When the lever 41 is pulled rearwardly it is released from the spider to permit free pivoting movement through 360° of the seat. When the seat has been pivoted to its desired position, the handle 41 is released and the lever will engage the corresponding slot on the spider 40. In the present embodiment of the invention, the seat may be pivoted to any one of six rotative positions as may be seen in FIG. 9.

It is to be noted that the seat post swivel axis as defined by the swivel post 39 is positioned about 25% of the distance from the rear edge 42 of the seat toward the front edge 43. This position of the Swivel post thus enables the front edge 43 of the seat to project outwardly of the rear end 44 of the rear frame portion 13. This position of the seat when pivoted 180° provides the occupant a significantly greater degree of flexibility in making golf shots while remaining seated in his vehicle. Also, when the seat is pivoted to any of the other angular positions such as 45°, 135°, 225° or 315°, the occupant can easily make golf shots while seated. These angular positions will depend on the direction which the vehicle must use to approach the golf ball. When the seat is pivoted in any of these above listed angular positions the golfer may rest one foot upon the foot rest to steady himself while making the shot.

Figure 10:
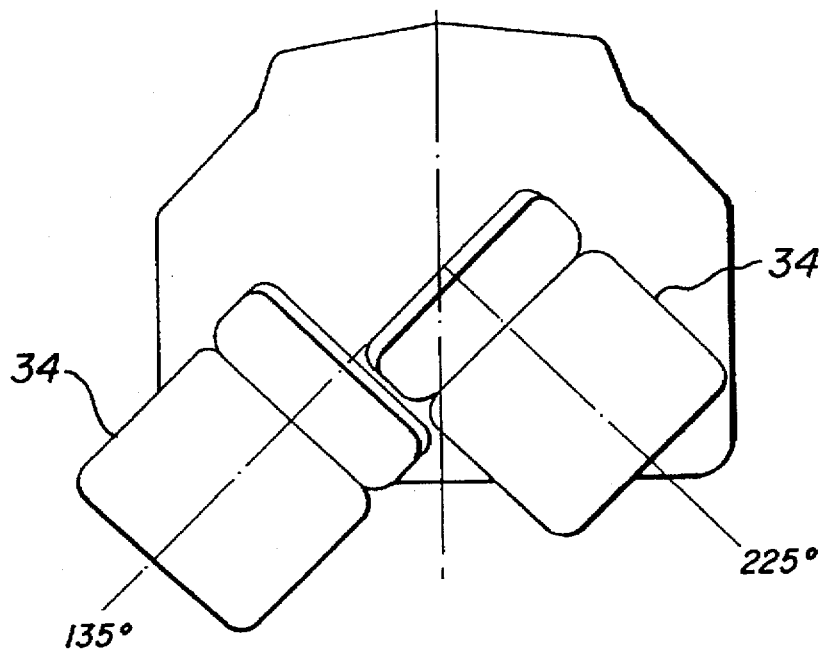
FIG. 10 is a view similar to that of FIG. 9 but showing pivoted positions of the seat in different pivoted and longitudinal positions of the seat base.

The seat unit and particularly the base 35 can be modified so that the base is also pivotable upon the seat post frame 36. Thus, the base can be pivoted into angular positions such as shown in FIG. 10 and the seat then moved longitudinally along the seat unit to positions such as the 135° position in which the seat is fully extended and the 225° in which the seat is partially extended.

The seat 34 is provided with flip-up arm rests 45 which gives the rider occupant comfortable, secure seating for prolonged use.

The golf vehicle 10 according to the present invention has a light weight of about 275 pounds and thus has the ability to drive anywhere on the course including up on the greens without leaving a mark any greater than that of a human footprint.

It has been shown that even severely disabled players can participate using the swivel seat and a lap belt to play from the seated position. Other features, some of which are shown in the drawings, may include a built-in holder, tiller-mounted scorecard and tee holders and other convenience items which may be provided as discussed above.

The seat 34 is thickly padded and is fully spring so as to provide comfortable, secure seating for the duration of a round of golf. The front and rear wheels of the vehicle are provided with Turf Saver tires which have been accepted by most golf courses in the United States.

Figure 2:
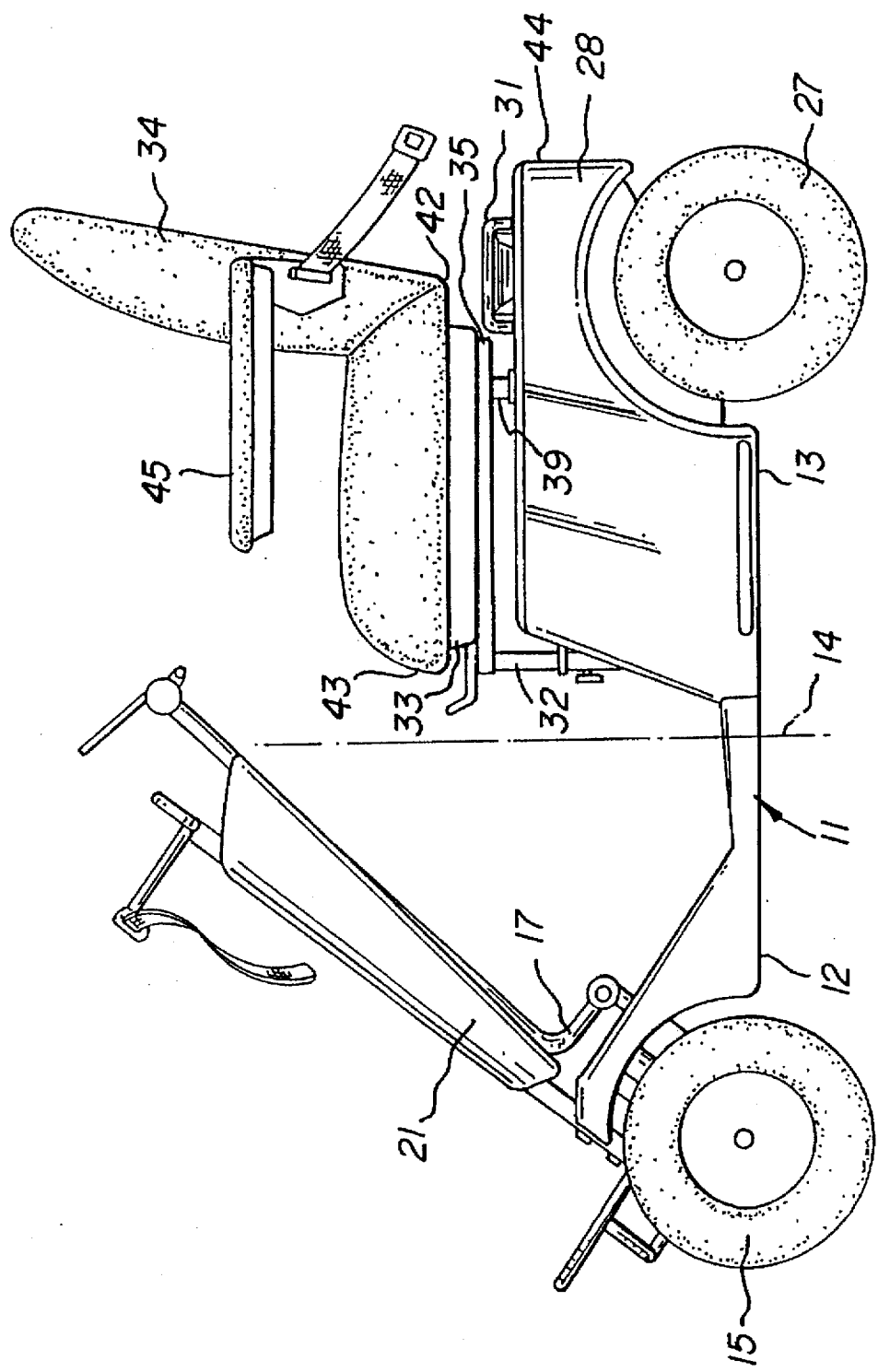
FIG. 2 is a side elevational view of the vehicle in FIG. 1.
Figure 3:
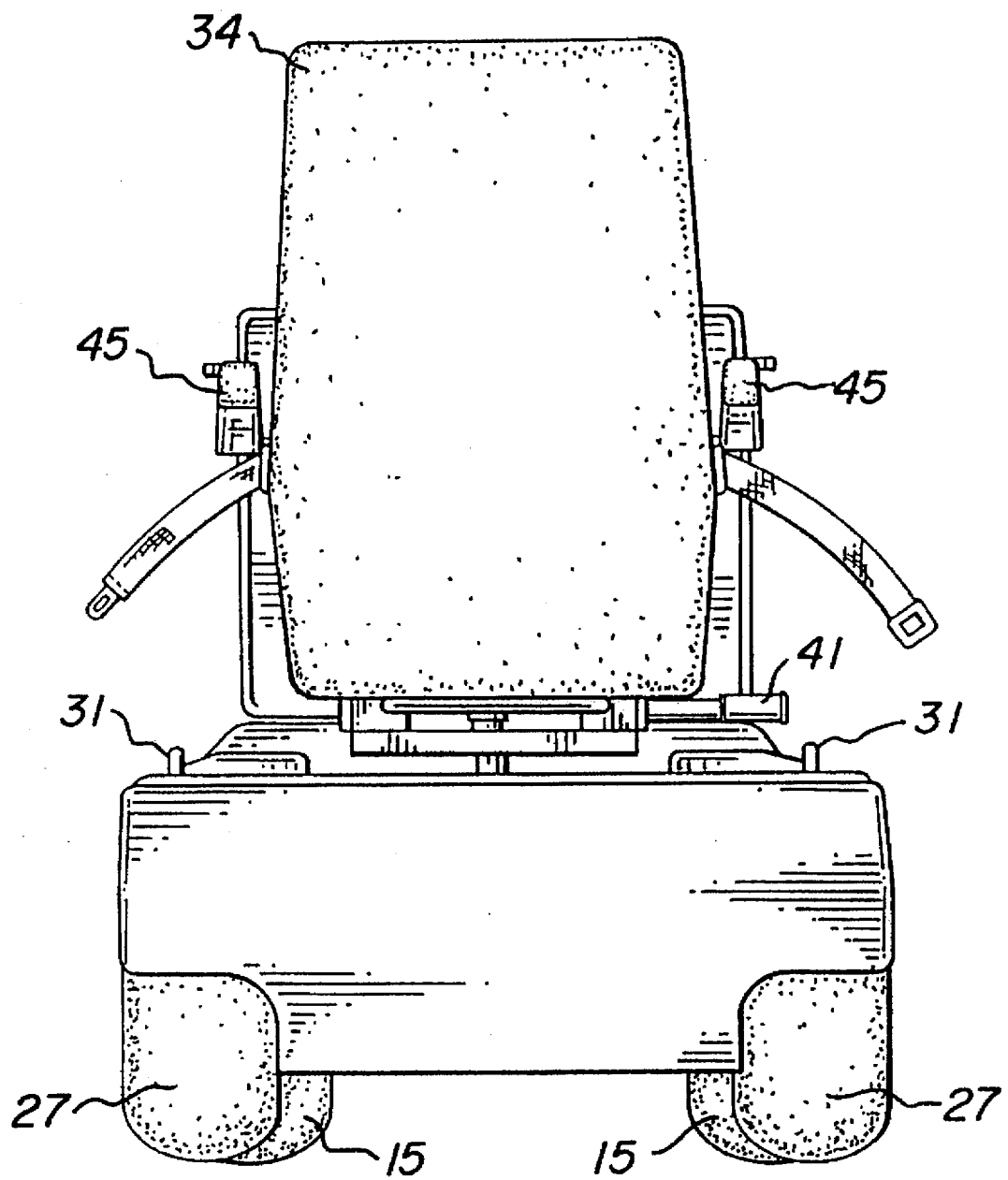
FIG. 3 is a rear elevational view of the vehicle in FIG. 1.
Figure 4:
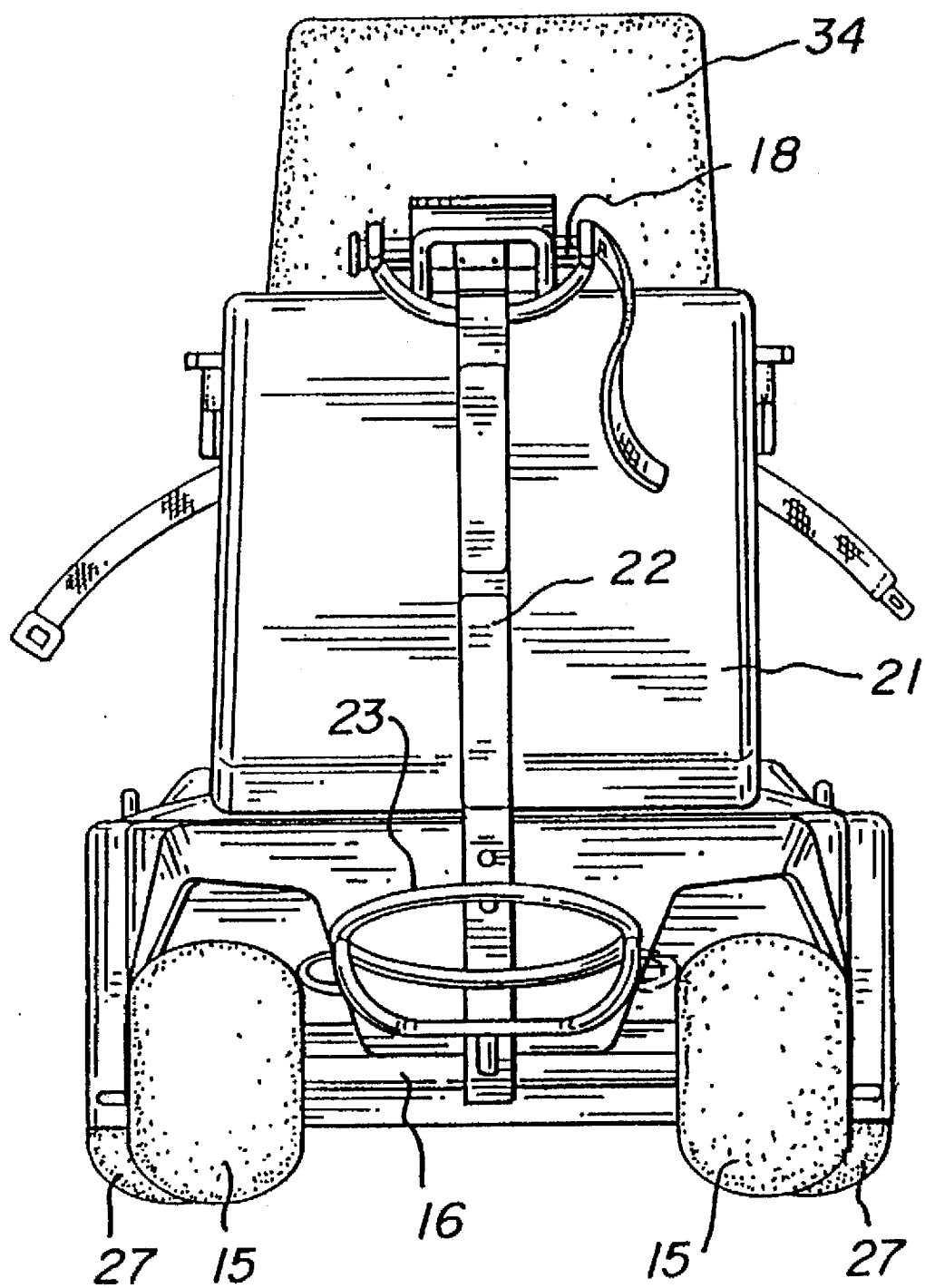
FIG. 4 is a front elevational view of the vehicle in FIG. 1.
Figure 9:
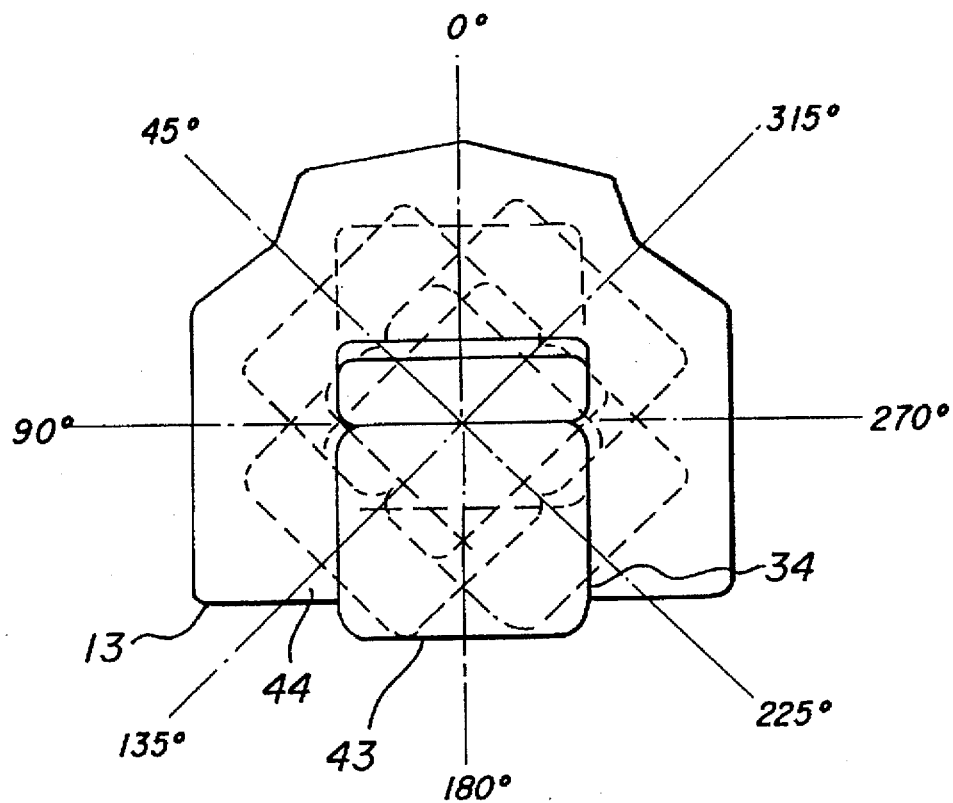
FIG. 9 is a diagrammatic top plan view of the rear portion of the vehicle of FIG. 1 showing pivotable positions of the seat.

The seat 34 is shown in its normal or forward operating position in FIG. 2 and from this position the seat can be moved longitudinally to the vehicle toward the rear a distance of approximately nine inches. Further, in any one of these longitudinal positions, the seat may then be pivoted and locked in any of the rotative positions as shown in FIG. 9.

For further flexibility, the seat unit 35 can also be provided with a lifting mechanism so that the height of the seat may be adjusted over a range of several inches. These additional heights may be preferred for some types of golf shots by certain golfers.

In FIGS. 11–15, there is shown a golf vehicle according to the present invention having a modified seat structure which includes a revolving seat mechanism having its pivot axis offset toward the rear end of the vehicle to such a position that the occupant of the seat needs only to pivot the seat to a desired position in order to make a golf shot. In this modification, the seat 34 is mounted upon a revolving seat mechanism indicated generally at 46 and pivotable about a vertical axis 47 which is located about ¼ of an inch rearwardly of a center line 48 passing through the center of the axis of the rear wheel 27. The revolving seat mechanism 46 comprises a rectangular seat frame 49 and on the underside of one end of the frame there is attached a bearing support plate 50 upon which are mounted a plurality of support bearings 51. The support bearings 51 are arranged with three of the bearings being positioned under the seat frame and a remaining bearing positioned outside of the frame as can best be seen in FIG. 15. The support bearings 51 ride upon an index plate 52 which is in the form of a sprocket having a plurality of notches 53 around the circumference of which as can also be seen in FIG. 15. The index plate is attached to the upper end of a tubular support post 54 and is supported thereon by a plurality of equally spaced support webs 55.

At the upper end of the support post 54 there projects a pin or shaft 56 around which the seat frame 49 piovts. The tubular support post fits upon a main post 57 which is comparable to the previously described vertical post 39. This main post is mounted on the frame of the vehicle in such a position that the center axis 47 of this main post is located on the order of ¼th of an inch behind the vertical central axis 48 passing through the axle of the rear wheel 27.

The support post 54 is provided with a plurality of adjustment hole 58 through which can be mounted a locking pin 59 which is removable and insertable in a selected adjustment hole in order to position vertically the seat mechanism at a desired height.

The seat frame can be locked in a desired pivoted position by the twin release cams 60 which are mounted on a shaft 61 journaled in bearing blocks 62 located on the underside of the seat frame 49. As may be seen in FIG. 15, the twin release cams are engageable with a pair of adjacent notches 53 in the index plate 52 to lock the seat frame in a desired position.

Figure 14:
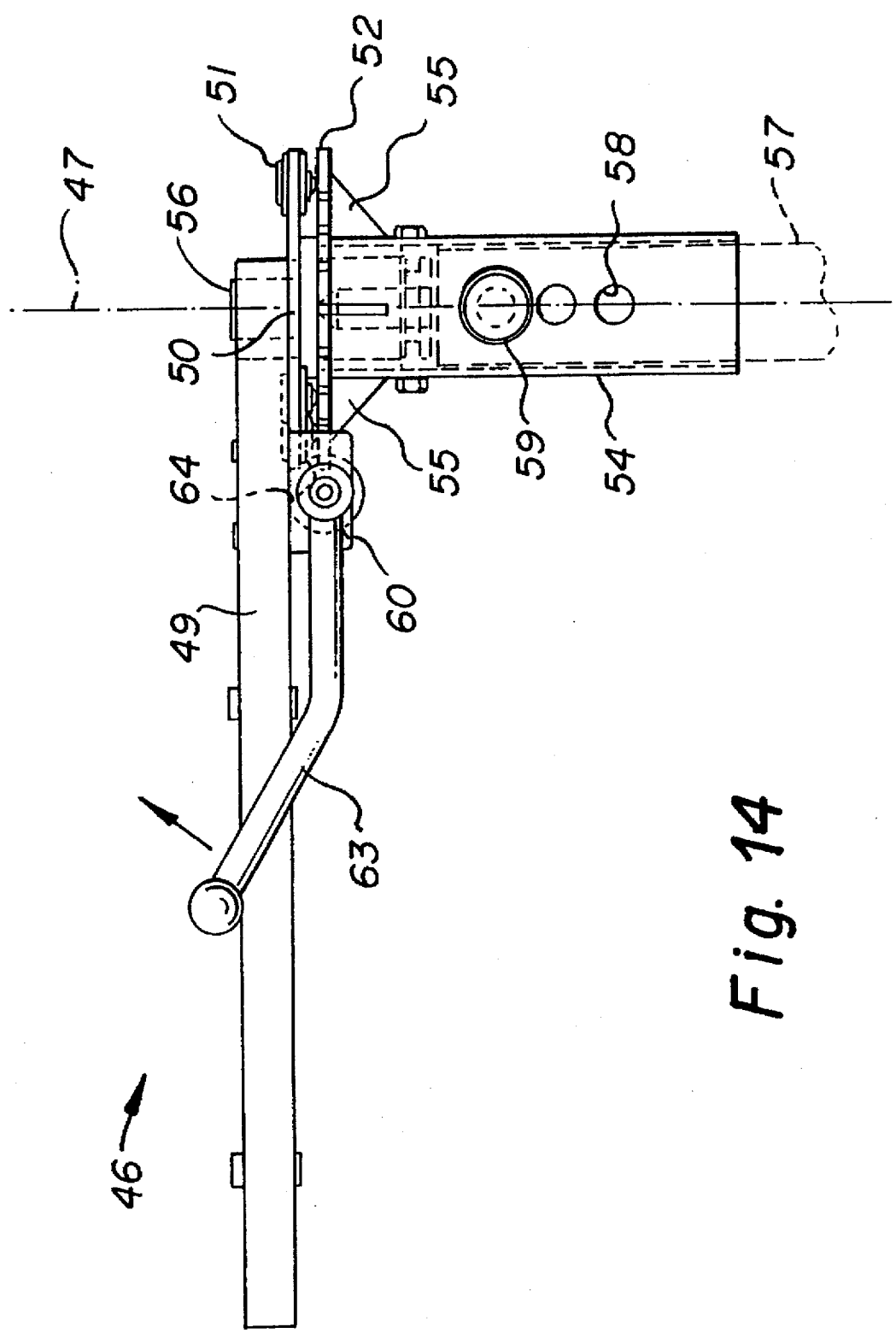
FIG. 14 is a side elevational view in enlarged scale of the revolving seat mechanism in the vehicle of FIG. 11.
Figure 15:
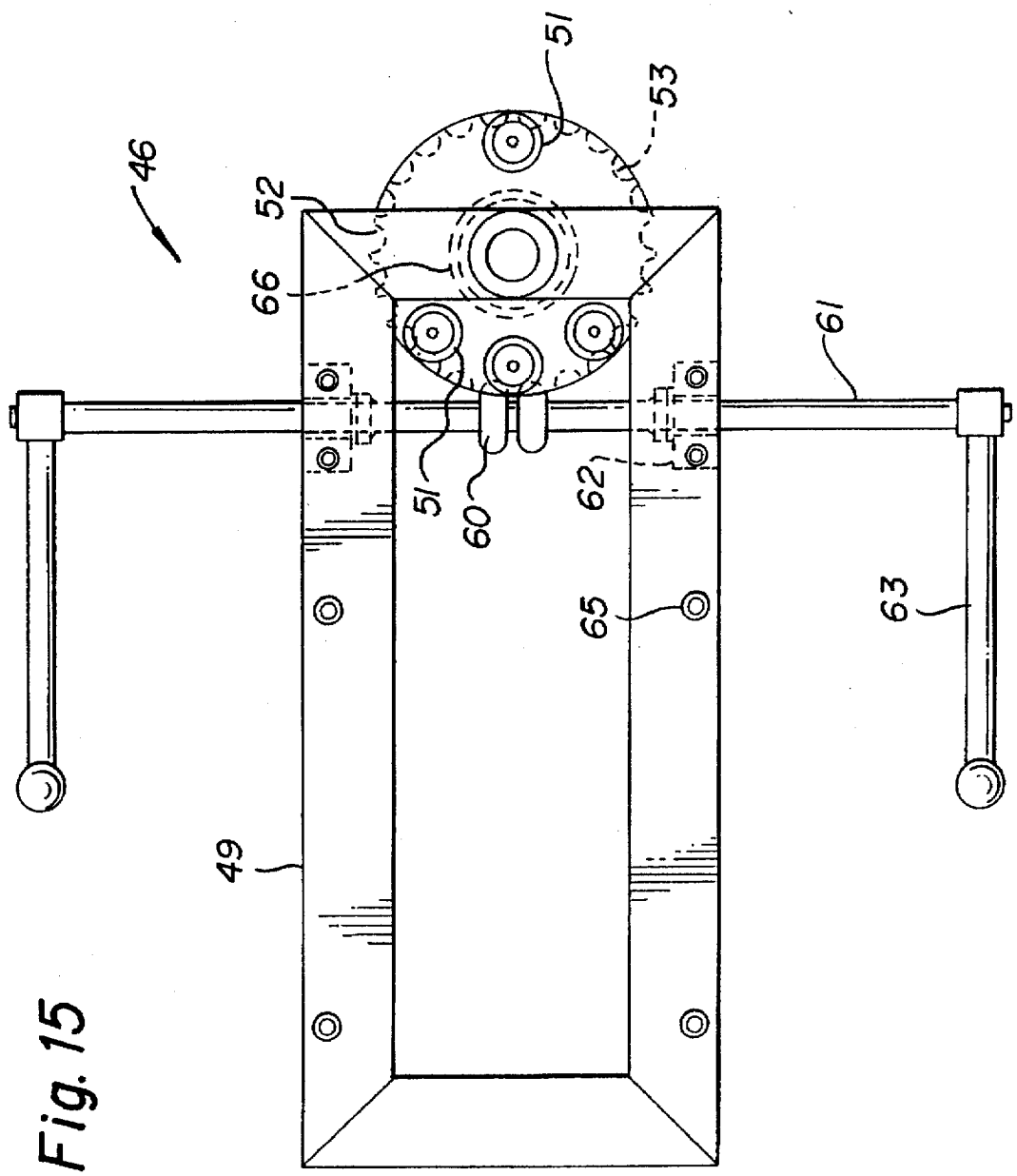
FIG. 15 is a top plan view of the revolving seat mechanism shown in FIG. 14.

The cams are released from the notch by pulling release handle 3 is an upward direction as seen in FIG. 14. As further seen in FIG. 14, the release cams are notched at 64 so that pivoting the release cam in a clockwise direction by upward movement of the release handle 63 aligns these notches with the index plate 52 to unlock the seat frame and thus permit the seat frame to be rotated into a desired position.

The seat frame 49 is provided with mounting holes 65 for attachment of the seat 34 to the seat frame.

Figure 11:
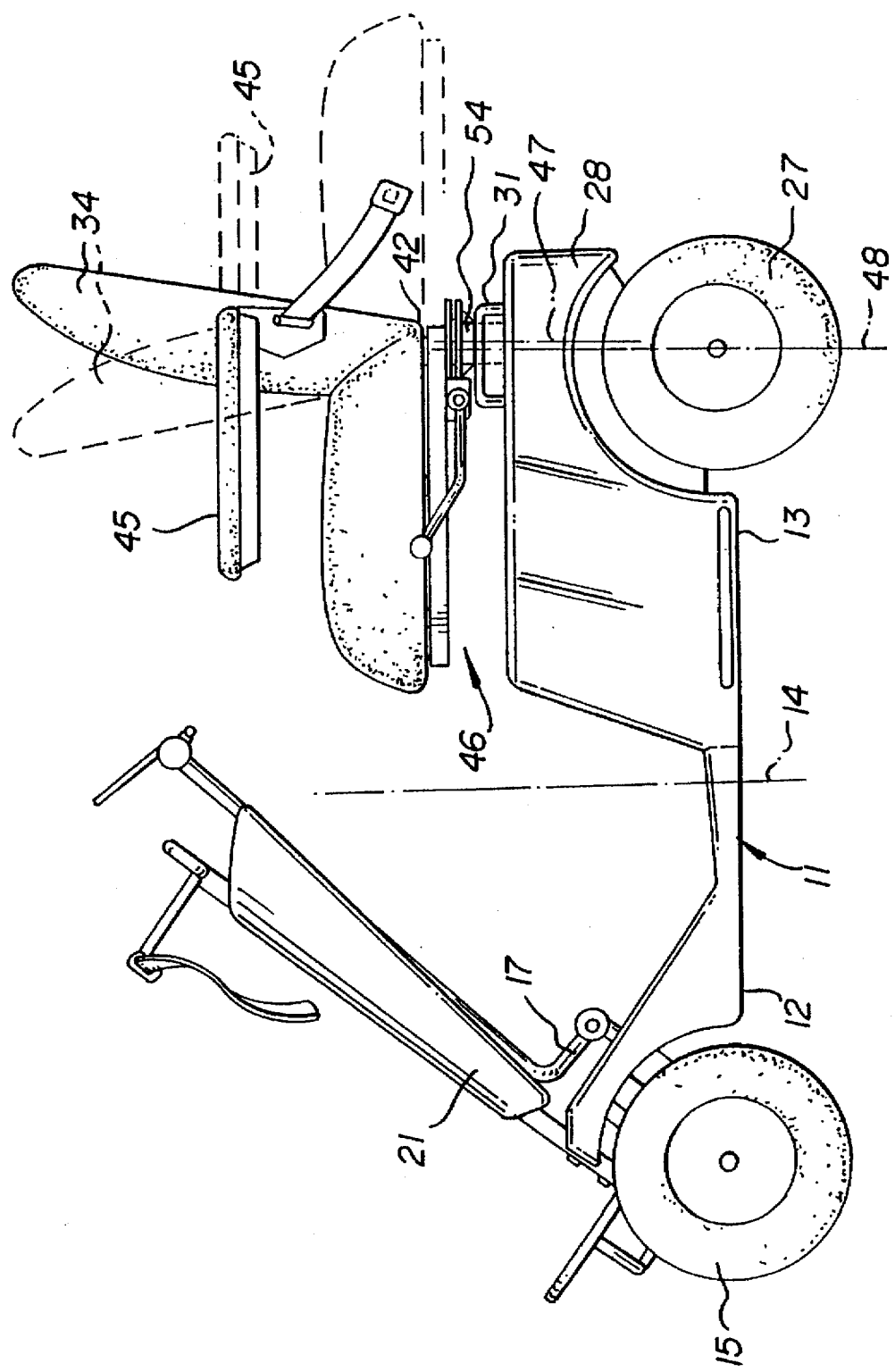
FIG. 11 is a side elevational view of the vehicle similar to that of FIG. 2 but showing a modified vehicle with the pivotable seat having its pivot axis offset rearwardly.

It can be readily seen that when the seat is rotated 180° from the operating position as shown in FIG. 11 to the position indicated by the phantom lines, the forward edge of the seat is well beyond the rear end 44 of the frame of the vehicle to provide the seated golfer free and unimpeded access to a golf ball resting on the ground. As will be apparent from FIG. 15, the seat can be rotated into any one of the rotative positions as determined by the notches 53 in the index plate 52. The seat frame 49 is journaled about the pin 56 by a main bearing 66.

Figure 12:
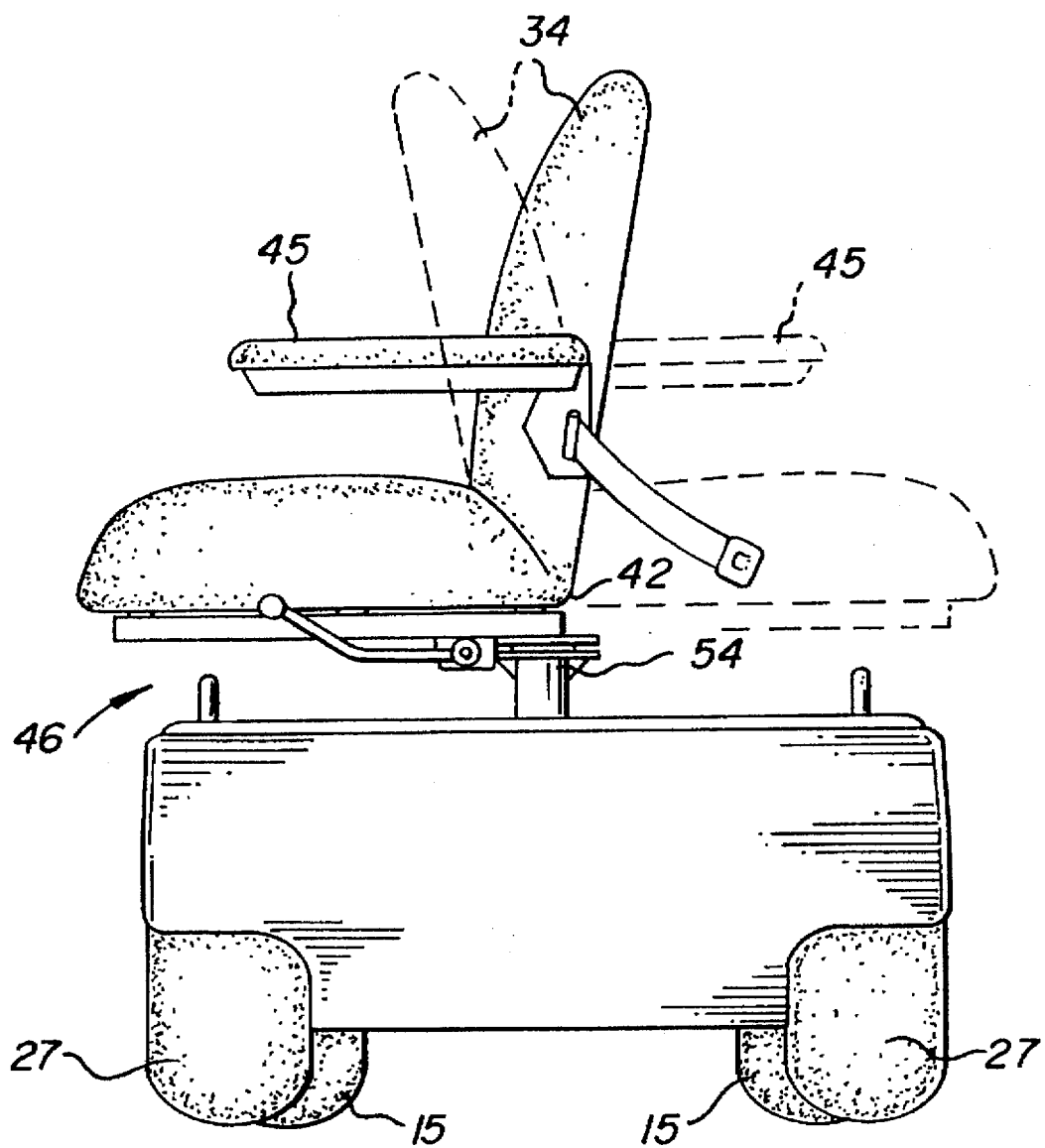
FIG. 12 is a rear elevational view of the vehicle of FIG. 11 and showing the seat pivoted to 90° and 270° positions.
Figure 13:
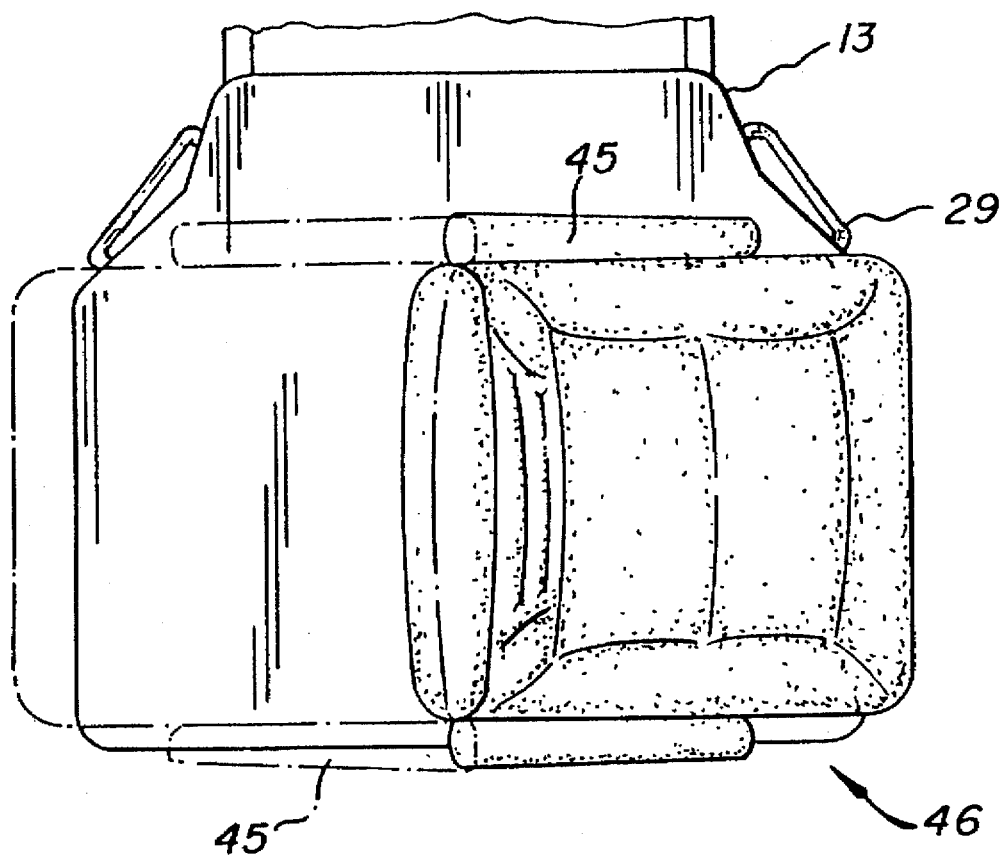
FIG. 13 is a top plan view of the rear portion only of the vehicle of FIG. 11 and showing the seats in the position illustrated in FIG. 12.

It is to be noted that in this modification of the seat mechanism, the pivot of the seat as defined by the vertical axis 47 is positioned over and preferably slightly behind the axle of the rear wheel 27. This position enables the front edge 43 of the seat to project considerably beyond the rear end 44 of the rear frame portion 13 as shown in FIG. 11 as compared with the seat frame mounting shown in FIG. 2. This position of the seat also enables the front edge 43 of the seat to project laterally outwardly beyond the sides of the vehicle when the seat is pivoted 90° or 270° from the front operating position as shown in FIGS. 12 and 13. It will be readily apparent that these positions of the seat with respect to the vehicle frame when the seat is pivoted 90°, 180° or 270° or angles in between these positions provide the occupant a much greater degree of flexibility in making golf shots while remaining securely seated in his vehicle. Further, this wide range of positions of the seat is achieved without the necessity for any sliding or longitudinal adjustment of the seat as shown in FIG. 2.

The locking pin 59 for adjusting the vertical height of the seat is accessible from the rear of the body cover and thus can be actuated without the necessity for removing the body cover.

It is therefore apparent that the present invention has provided a new golf vehicle which enables golfers with a wide range of walking or leg disabilities to play golf from tee to green.

It will be understood that this invention is susceptable to modification in order to adapt it to different usages and conditions, and accordingly, it is desired to comprehend such modifications within this invention as may fall within the scope of the appended claims.

What is claimed is:

1. A golf vehicle comprising a frame having front and rear portions, said front portion having at least one steerable front wheel and a steering mechanism including an upstanding rearwardly inclined handle bar, said frame rear portion having a rear end and a pair of drive wheels and a power source drivably connected to said drive wheels, a seat unit comprising a seat having a front edge and mounted on a pivot axis upstanding from said frame rear portion, seat adjustment means on said seat for pivoting said seat 360 degrees around said axis, said seat having a forward operating position in which an occupant thereof can drive and steer the vehicle, said pivot axis of said seat being so disposed when said seat is pivoted 180 degrees from said front operating position the front edge of said seat extends rearwardly beyond the rear end of said frame rear portion to enable an occupant of the vehicle to make golf shots while seated, and a pair of hand grips on the top surface of said frame rear portion, each being disposed adjacent a respective side and the rear end of the frame rear portion to assist an occupant of the vehicle in adjusting the position of the seat while seated thereon.

2. A golf vehicle comprising a frame having front and rear portions, said front portion having at least one steerable front wheel and a steering mechanism including an upstanding rearwardly inclined handle bar, said frame rear portion having a rear end and a pair of drive wheels and a power source drivably connected to said drive wheels, a seat unit comprising a seat having a front edge and mounted on a pivot axis upstanding from said frame rear portion, seat adjustment means on said seat for pivoting said seat 360 degrees around said axis, said seat having a forward operating position in which an occupant thereof can drive and steer the vehicle, said pivot axis of said seat being so disposed when said seat is pivoted 180 degrees from said front operating position the front edge of said seat extends rearwardly beyond the rear end of said frame rear portion to enable an occupant of the vehicle to make golf shots while seated, said pivot axis of said seat is vertically aligned with the axis of the drive wheels on said rear frame portion.

3. A golf vehicle as claimed in claim 2 wherein said pivot axis passes vertically through the rear end of said seat.

* * * * *